Sept. 9, 1958    F. G. LAMB    2,850,809
APPARATUS FOR DEHYDRATION OF FOOD PRODUCTS
Filed Feb. 15, 1957    7 Sheets-Sheet 1

INVENTOR
Frank G. Lamb
BY Thomas, Meisman & Russell
ATTORNEYS

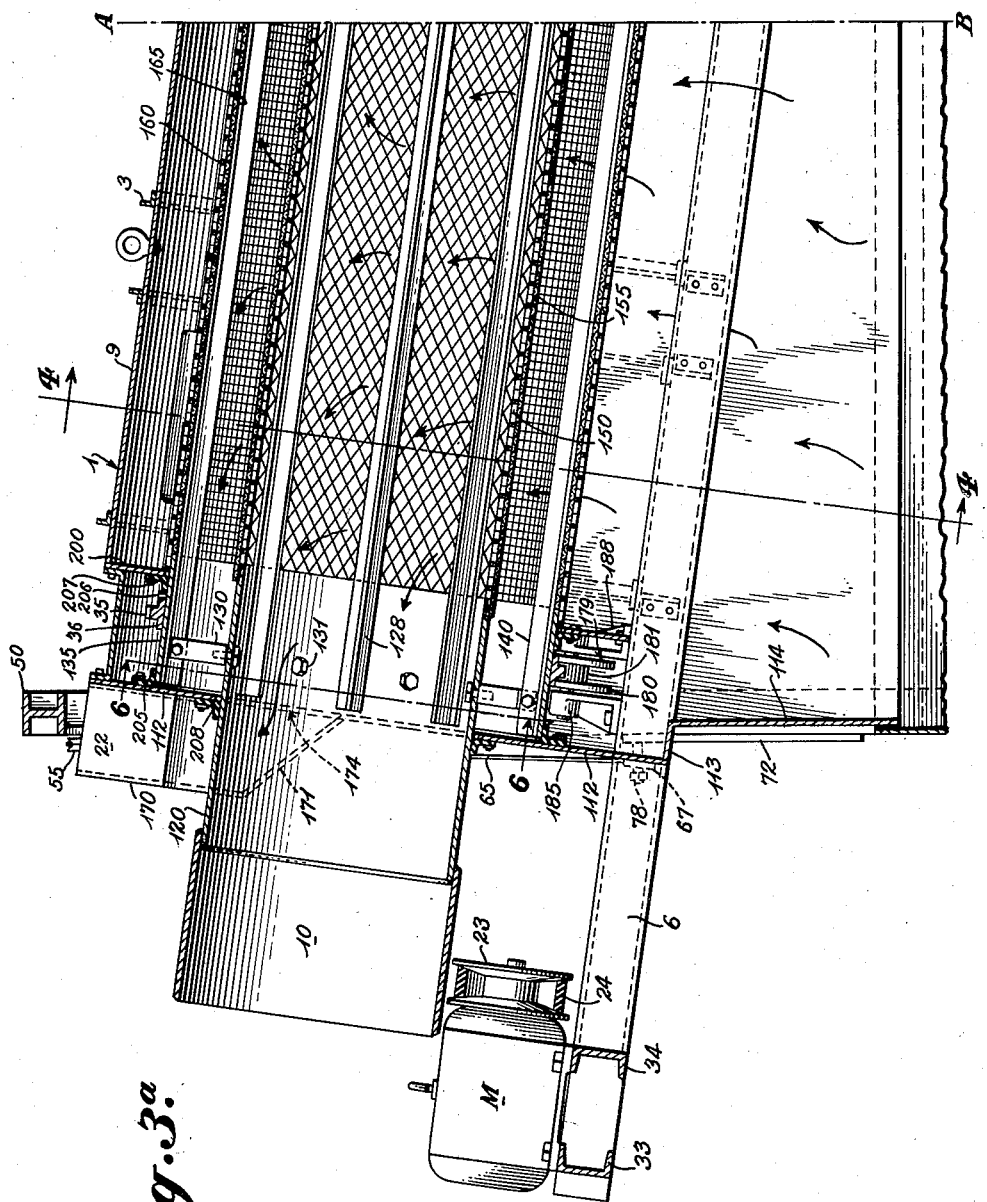

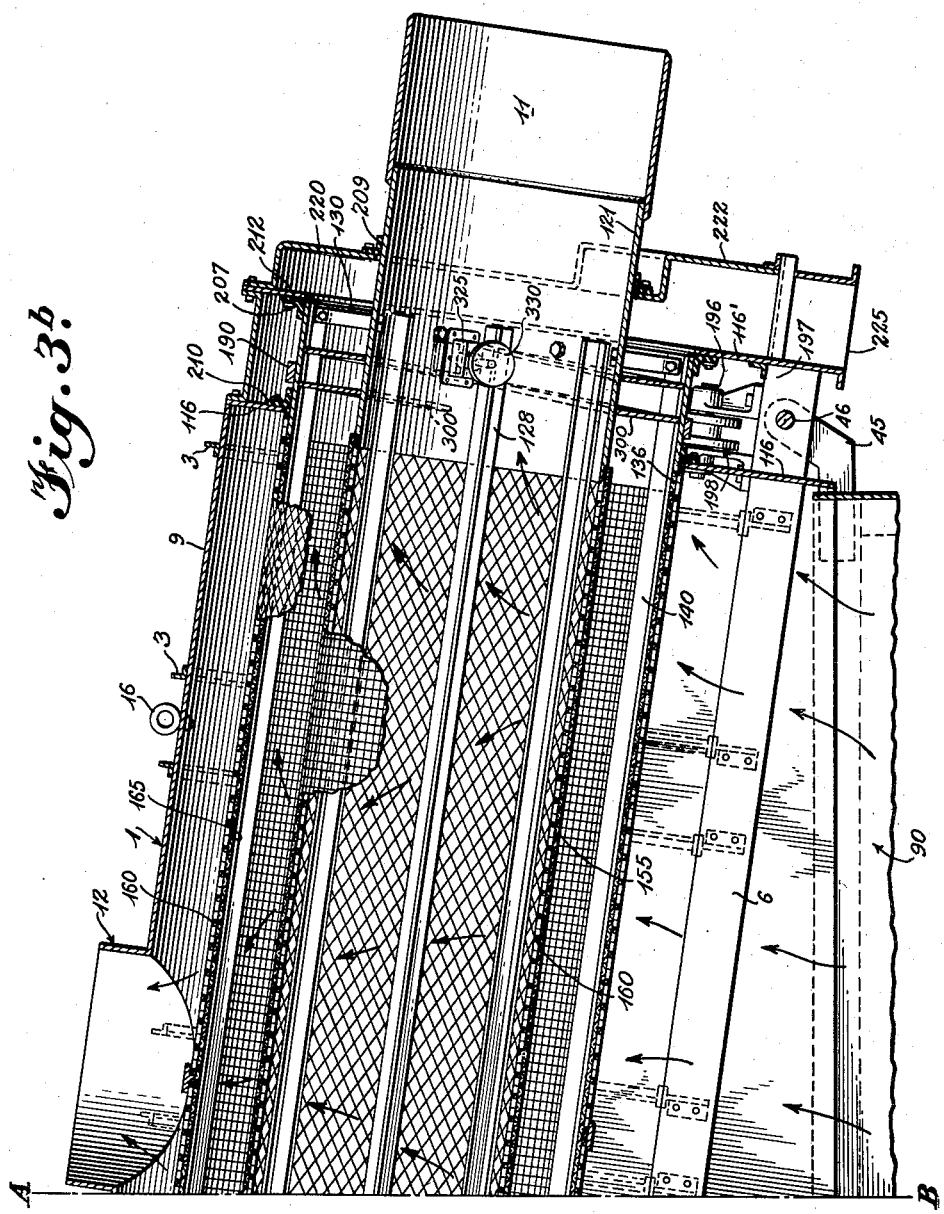

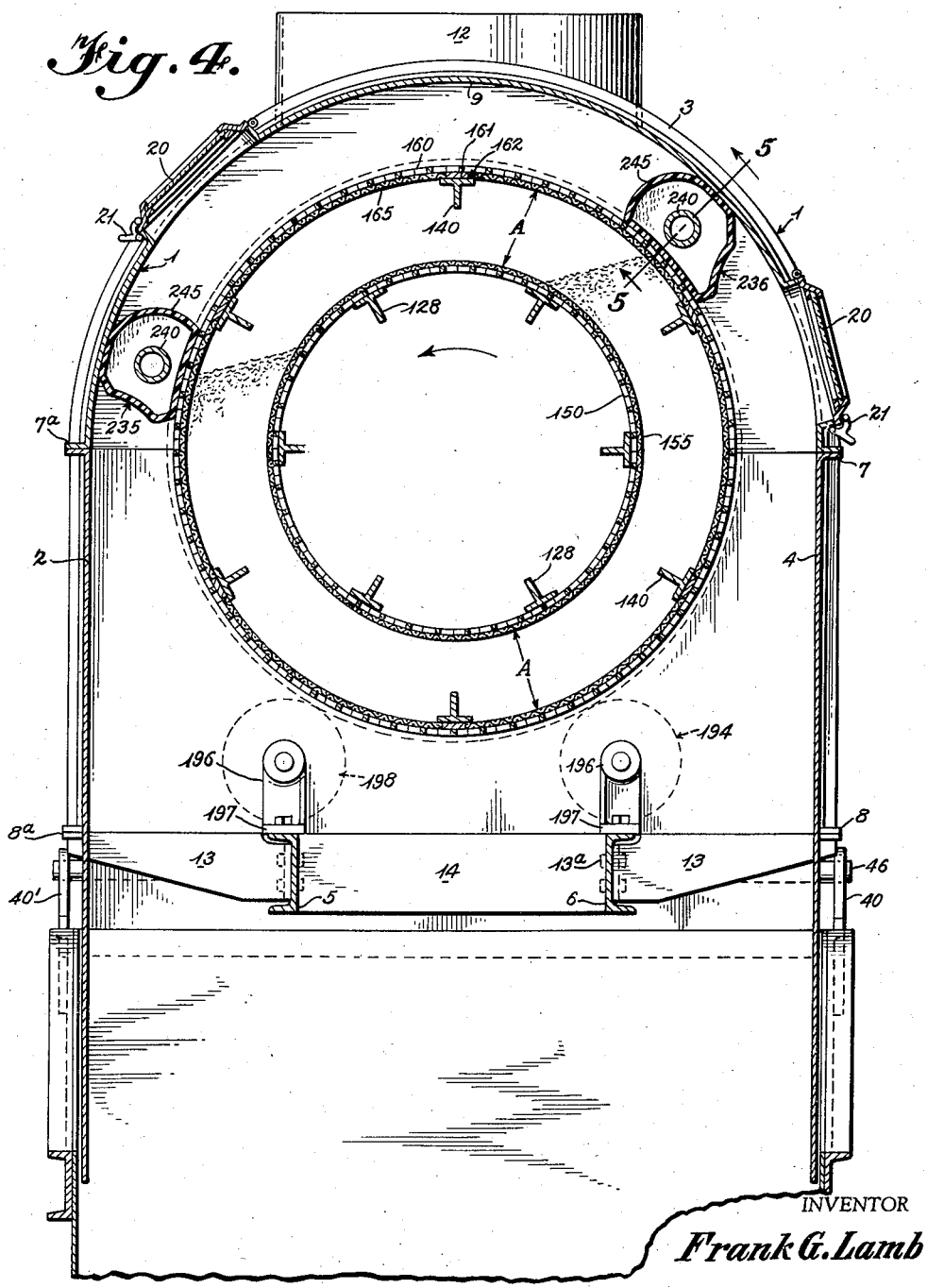

Sept. 9, 1958 F. G. LAMB 2,850,809
APPARATUS FOR DEHYDRATION OF FOOD PRODUCTS
Filed Feb. 15, 1957 7 Sheets-Sheet 6
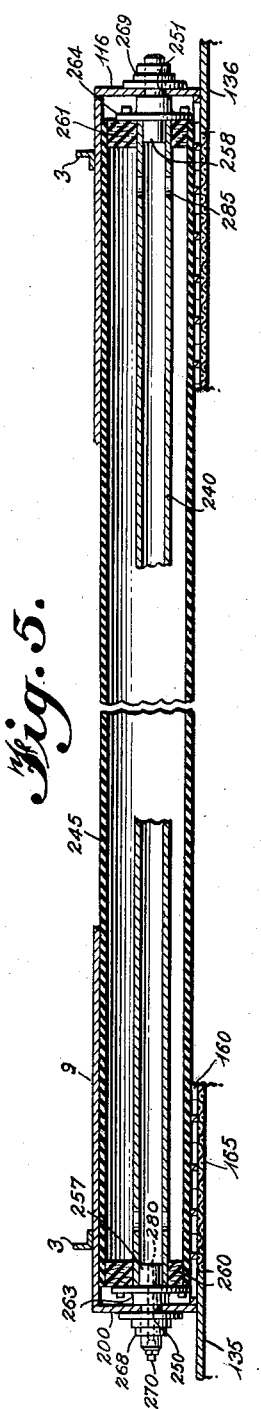
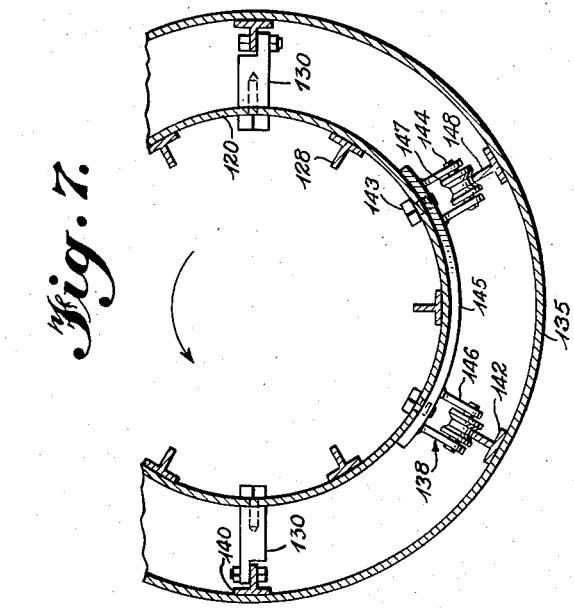
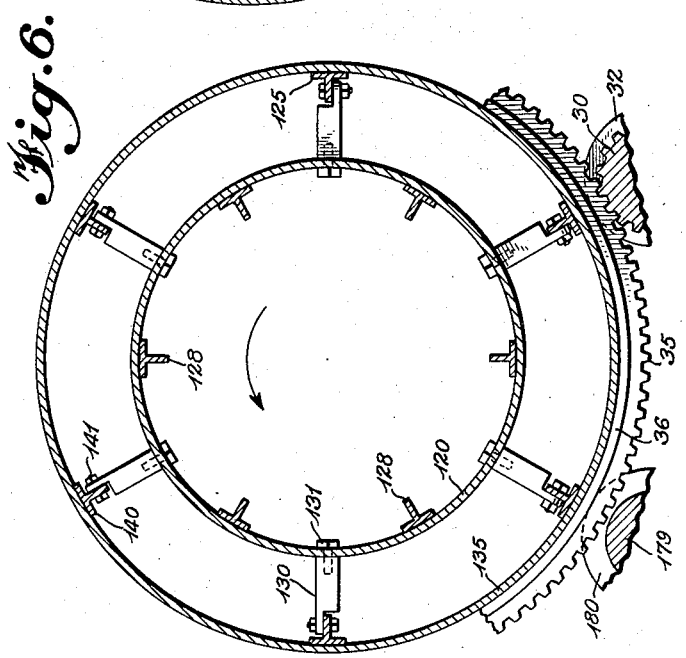
INVENTOR
*Frank G. Lamb*
BY *Thomas, Weisman & Russell*
ATTORNEYS

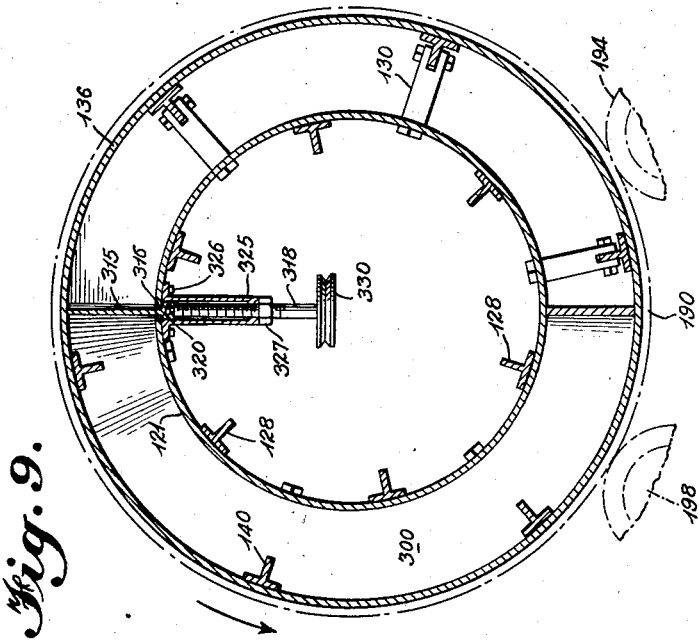
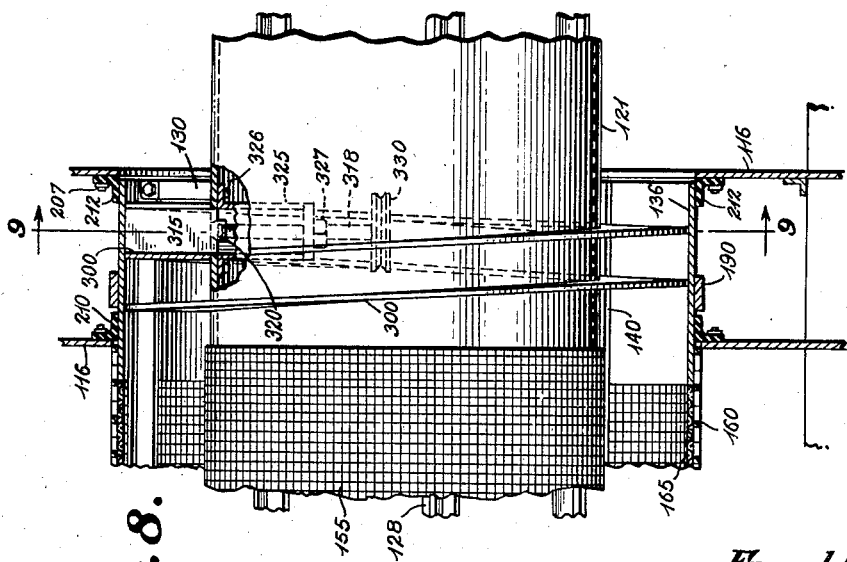

United States Patent Office
2,850,809
Patented Sept. 9, 1958

2,850,809

APPARATUS FOR DEHYDRATION OF
FOOD PRODUCTS

Frank G. Lamb, Weston, Oreg.

Application February 15, 1957, Serial No. 640,383

9 Claims. (Cl. 34—128)

This invention relates to a dehydrator for food products and particularly a dehydrating mechanism involving the principle of rotary partial dehydrating. The mechanism is characterized by the use of a double drum unit having concentric, double, perforate, peripheral walls, the product being contained between the walls of the two drums and, in the process of drying, being subjected to comparatively dry air heated to a predetermined, elevated temperature. The involved method tends to utilize, in a most efficient manner, all of the available drying medium largely because of the accurate channeling and control of such medium so as to effectively contact it with all of the food particles charged to the unit.

Certain types of drying of food products, such as fruits and vegetables, are known to the art. These procedures are generally of a rather simplified nature as, e. g., such drying being accomplished by passing the product on trays through a confined, heated enclosure for the length of time sufficient to drive off substantially all of the moisture. These procedures, too, generally contemplate what might be considered for all practical purposes as complete drying or drying to such an extent that there remains in the dried product only approximately 5% of the original moisture content. In sharp distinction to this type of process or to related means and methods for so-called complete drying, the instant mechanism and method is pointed to what I prefer to term "partial" dehydrating. Here, only 35% to 60% of the moisture (depending upon the type of product being handled) is removed:

The purpose of partial dehydrating is to produce a product that can be fully reconstituted by the addition of water, accomplishing hydration of the product to the extent that the moisture content thereof is increased to its full and original value. In complete dehydration of the product, reconstitution thereof is not possible. By a "reconstituted product" is meant one which, when hydrated, subsequent to partial dehydration, regains its original structure, taste, and appearance.

Applicant's mechanism accomplishes such partial dehydration to the extent indicated and does enable the product to thereafter be reconstituted to its original characterictics, whereas the complete dehydration, as generally known to the art, results in a product that can not be completely reconstituted.

There have been attempts to accomplish applicant's objectives, i. e., partial dehydration, but these have been accompanied by various difficulties and disadvantages. For example, drying in a rotary drum has been proposed, the product lying loosely within the confines of a perforated, rotary receptable and the product being admitted to that receptacle in such amount as to fill only a very small portion thereof. In such instances, the drying air is forced into the drum. However, there being no control over the disposition of the product within the drum, such air performs drying very unevenly, largely because admission of the drying medium under pressure blows the product about. This causes open spaces to form and the heated air bypasses through these open spaces and, not contacting the product at all, results in a wasetful and inefficient operation.

Similarly, in a rotary drum of this type, with the product so loosely confined within the interior thereof, rotation of the container results in excessive abrasion of the product with obvious and consequent deterioration thereof.

Similar problems have confronted those who have attempted partial drying or dehydrating using the belt conveyor type of drying means. Here, a perforated belt is subjected to air at elevated temperatures, the product being loosely placed upon the surface of the belt and moving therewith. The drying medium is forced through the belt from underneath it. In this instance also, even though abnormal and great amounts of drying air be employed, effective dehydration is difficult because the product is blown about so much by this application of the drying medium under pressure as to be discharged from the surface of the belt. Here, also, when this loose product is subjected to heated air, at a velocity sufficient for the required purpose, gaps or openings naturally tend to form in the layer of the product. Thus, a major projection of such air is by-passed with consequent little drying effect upon the product.

The belt dryer of the type already referred to is also expensive to fabricate since it must necessarily be made of stainless steel or some equivalent, non-corrosive and costly material. Even if made of this type of metal, continuous usage of the belt soon causes it to become extremely soiled by the product. A proposed answer to this problem has been to immerse the belt at one portion of its cycle in a liquid bath, but this involves other disadvantages—some moisture will adhere to the surface of the belt and thus create an even greater drying problem since it is an addition to the amount of moisture which must necessarily be removed from the product.

Both belt dryers and single rotary drum constructions, because of the lack of control of flow of air at elevated temperatures, tend to use an excessive amount of such heated, drying air. From its commercial aspect, and spoken of in the volume here contemplated, heated air may be considered a somewhat expensive medium. At any rate, since in the instant invention all of the drying agent is controlled in the sense that it is forced through the product, contacting each of the separate particles, the expense of operation of the unit is actually far lower than the comparative expense involved in the known types of procedures and apparatus just referred to.

The present invention obviates these and other disadvantages by proposing a mechanism whereby the product particles are retained in a comparatively confined state, more or less as a solid mass. Hence, no problem of "blow-by" of the heated air is encountered. Also, because relative movement of the product particles is limited, the abrasive effect of these particles rubbing either upon themselves or against the screen mesh of the container is substantially eliminated.

Furthermore, by providing a type of mechanism and procedure herein to be described, the heated drying medium is efficiently used to its fullest extent. The entire volume thereof, necessarily being caused to pass directly through the mass of the product without bypassing the same, enables complete surface contact with the individual particles, resulting in an efficient and time-saving operation.

It is, accordingly, a primary objective of this invention to provide a means and method for partial dehydration involving the use of a double, concentric drum principle; such concept involves the use of air, at elevated temperatures and pressures, which is caused to pass through the product positioned between the two rotary screens to effectively remove a substantial amount of moisture from the product particles.

It is a further object of the invention to provide a mechanism of the described type wherein the path of flow of the heated air is so controlled as to force it through all of the product without scattering the latter or creating open spaces in the layered particles, thus permitting the drying medium to bypass and thereby diminishing its effectiveness as a dehydrating medium. In this respect, the apparatus is provided with both stationary and rotary sealing means. The latter engage the external periphery of the outer, perforated drum unit and, bearing against the cover or imperforate closure within which the unit is contained, block the passage of air throughout the length of the drums except in a path through the space between the two drums and thereby, through the bulk of the product contained therebetween.

Another object of the invention is the provision of apparatus which may also be easily controlled with respect to the rate of feed and discharge of the product to be partially dehydrated. The feed is regulated by varying the speed of rotation of the twin drums and the angle of inclination of the drum assembly to the horizontal. Discharge of the dehydrated product is obtained by a helical spiral means located at the discharge end of the unit. Such helical blade enables a metered flow of the product out of the unit. Such flow is further measured and controlled by a closure device in the spiral which can be set at any predetermined point to open or partially block the travel of the product through the convolutions of the spiral and, hence, regulate the flow of the product to its discharge point.

An additional object of the invention is the provision of apparatus of the type referred to above wherein subjecting the product to air at elevated temperatures and at predetermined velocities does not so disturb the product as to create undue abrasion thereof, either by rubbing the particles thereof against each other or against the comparatively rough screen mesh of either the inner or outer drums. The use of two rotating drums, one concentrically disposed within the other to provide a space for the product therebetween, so confines the material being partially dehydrated that rotation of these drums during the drying procedure does not cause an undue abrasive effect by the contacting of the particles against the inner or outer screens. This is because the relatively confined space, within which the product is contained, restrains relative movement of the material during rotation throughout the large portion of the particle mass. Such movement as does take place is primarily limited to the upper surface of the mass. Consequently, substantial abrasion of the particles, most of which move about rotating with the two perforate drums, is prevented. Yet the upper surface of the particle mass, as referred to, is continuously changing position and moving rearwardly, resulting in a constant exposure of different portions of the particle mass to the drying medium at one time or another during the several revolutions of the twin drum unit. A complete and effective surface contact of all the individual particles with the drying media is thus assured.

Another objective of the invention is the provision of a mechanism which is extremely flexible in use by reason of the ease with which rate of flow can be controlled, yet which, at the same time, has a comparatively large capacity. In this sense, although the apparatus to be described is not unduly complex, it is contemplated that approximately three thousand pounds of the product can be dehydrated per hour. This comparatively great capacity, as measured against devices known to the art, is possible due to the double drum structure enabling the product to be retained between the two screens throughout a substantial portion of the respective peripheries thereof in contrast to, for example, a single screen structure where only a relatively small proportion of the material can be handled during the drying procedure.

A further objective of my invention is the provision of a procedure and apparatus which, because it enables control and proper channeling of the drying medium, results in effective surface contact thereof with the product and, consequently, in efficiently using all the drying medium available, also results in a far less costly operation.

Another object of the invention is the provision of apparatus of the described type which, by reason of its relative simplicity of construction, can readily be dismantled for cleaning purposes and reassembled for operation in a minimum of time and labor cost.

Other objects, advantages and novel functions of the invention will be apparent from the following decription thereof, rendered in conjunction with the various Figures appended hereto, and wherein:

Figure 3a is a side elevation view, partially in section, of the forward or inlet end of the unit comprising the invention but broken at the line A—B;

Figure 3b is a side elevation view, partially in section, of the after part or discharge end of the unit and continuing the view of 3a at the line A—B;

Figure 4 is a sectional view taken on the line 4—4 of Figure 3a;

Figure 5 is a detailed sectional view, taken on the line 5—5 of Figure 4, of one of the roller seals which are positioned substantially oppositely to each other on the outside of the outer drum and contacting the casing of the unit;

Figure 6 is a sectional view of the double drum construction of the unit illustrating the drive means therefor taken on line 6—6 of Figure 3a;

Figure 7 is a fragmentary sectional view of the double drum construction also taken on line 6—6 of Figure 3a but illustrating the use of a slidable dolly support enabling withdrawal of the inner drum for dismantling and cleaning purposes;

Figure 8 is a view similar to Figure 3b but illustrating in more detail the construction of the sliding gate positioned within the discharge spiral and enabling metering of the amount of material discharged; and Figure 9 is a sectional view of the invention taken on the line 9—9 of Figure 8.

Figure 1:
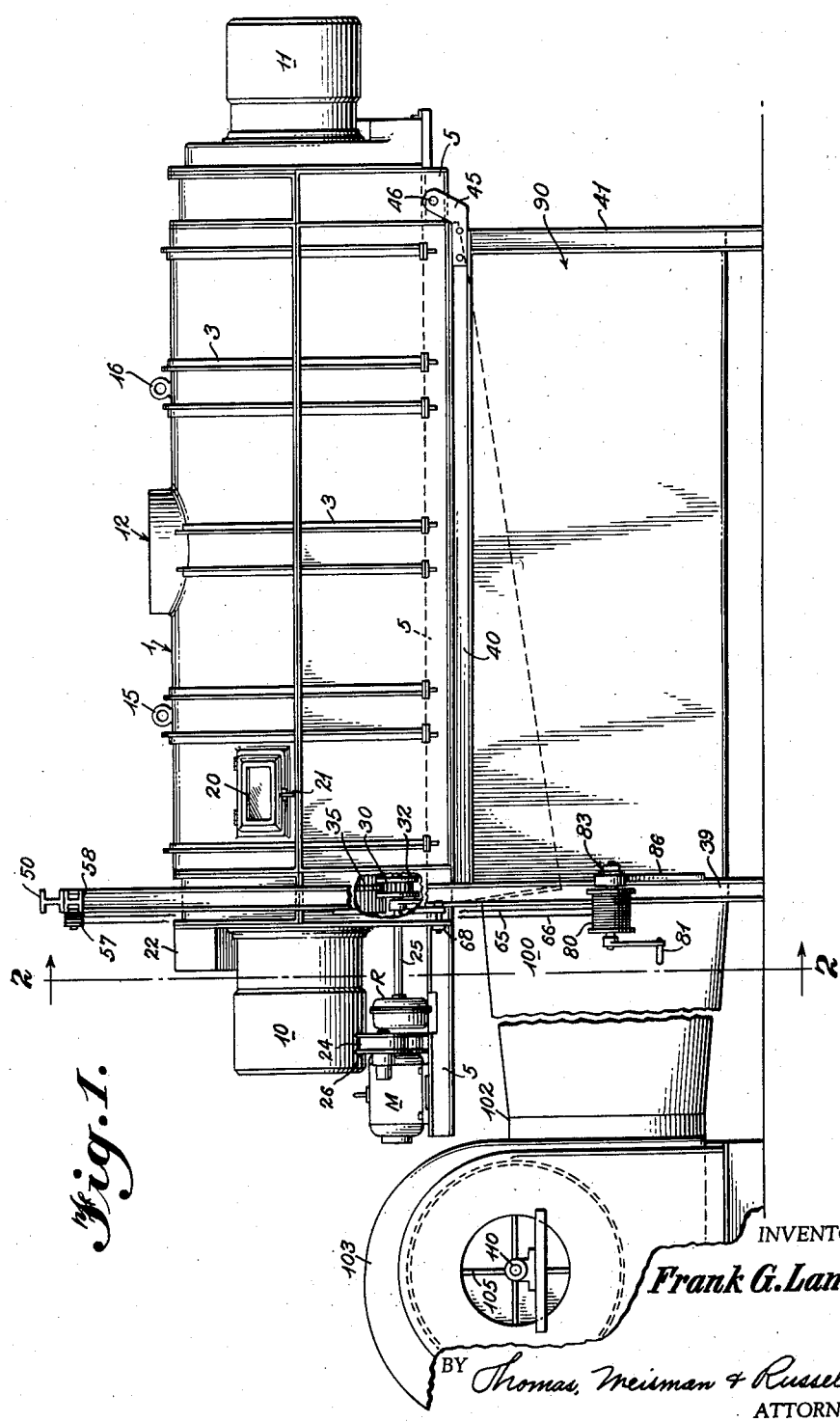
Figure 1 is a side elevation view of the structure of the invention.

Referring initially to Figure 1, it is seen that the rotating or tumbling unit is completely encased within a protective and air confining housing, generally indicated at 1. This semi-cylindrical cover is curved at the top to assume the contour of the two, concentric drums positioned therein. As seen in Figure 4, and as there shown, the two sides of the housing, 2 and 4, extend downwardly as skirts, so configured as to fit into a plenum chamber located underneath the double drum unit. As will be more particularly described hereinafter, these side plates or skirts 2 and 4 provide a more or less air-tight interconnection between the plenum and housing, irrespective of tilt of the latter.

The upper curved portion 9 of this housing is provided with flanges 7a at its lower ends to interconnect with complementary, lateral flanges 7 fabricated in the upper ends of the two side plates 2 and 4, also as clearly shown in Figure 4. Such flanges are affixed together in any suitable manner and the housing is held in position by a series of curved angle irons 3 that are, of course, complementary to its shape. These elements 3 extend over the top, down each side and, by means of suitable interconnections or flanges 8, are attached to cross braces 13, the latter being appropriately spaced throughout the length of the unit and fitted with complementary flanges 8a.

Longitudinally of the housing and supporting the various components thereof, as well as the rotary unit, are two spaced channel irons 5 and 6. These comprise the main supporting bed for the rotary unit and the motive power therefor and extend substantially throughout the length of the apparatus.

The referred to channel irons support additional structure in the form of cross bars 13 which can be interconnected with the main frame members by bolts 13a or by any other suitable media. These same main frame members can also be additionally strengthened by spacers 14, transversely mounted between such channel irons and spaced appropriately throughout the length of the unit. The structure just recited thus constitutes the main frame work for all of the related elements and, accordingly, when this framework is tilted to the desired angle to the horizontal, as will be explained, all of the dehydrator mechanism is likewise tilted.

The housing 1 terminates at either end in air discharge outlets 10 and 11, respectively, comparatively large in dimension. An additional air outlet, generally indicated at 12, is provided at the top and at or near the midpoint of the housing 1, the top semi-cylindrical portion of which is designated at 9. Since the unit is designed for ready disassembly, the eyes 15 and 16, shown in Figure 1, are affixed to the housing for removal of same during this operation. The housing may also be provided with several windows 20, two here being shown with reference to Figures 1 and 4. In this embodiment of the apparatus, such windows are hinged and take the form of access doors which are suitably locked by any common form of dog latch 21 to maintain the same in suitable sealed relationship with the housing. These windows permit visual inspection of the operation and, when opened, permit minor adjustments of the internally mounted air seals, to be described.

A charging feed hopper 22 is positioned at the front or inby end of the twin drum unit and this, as will be seen, opens directly into the space or area in between the peripheries of the two rotating drums. The material or food product charged into this food hopper 22 passes through the space between these drum units and, progressing rearwardly, finally discharges out of a suitable spout located in the discharge opening 11. The latter, as described above, also provides an exit for the dehydrating air or other medium that is passed through the mechanism for drying purposes.

Such dehydrating medium is admitted to the plenum chamber and the remaining twin drum apparatus at a temperature from about 100° F. to about 160° F. The preferable temperature within this range is approximately 120° F., this being variable within the range to accommodate problems arising with respect to various types of food products. At any rate, such temperatures are substantially lower than those generally employed in the so-called complete dehydration of food products. They are at a level, however, fully sufficient to obtain the partial dehydration in the sense employed with respect to this invention.

The double drum construction of the dehydrating mechanism is, as stated, rotatably supported by means which will be more particularly described hereinafter. At any rate, a suitable motor M drives a reduction gear mechanism R through a belt drive 24, the latter rotating the drive pulley 26 to such reduction gearing assembly R. A shaft 25, running from the latter, is adapted to drive a spur gear 30, this being located as the hub of a spool or trunnion having two sides 32. The spur gear 30 is designed to mesh with teeth of a large ring gear 35 that embraces the entire external periphery of the outer drum of the unit.

Actually, the ring gear 35 is of T-formation, the teeth thereof being made integrally with or affixed to the trunnion tire 36, which, as shown in Figure 3a, is supported upon the forward collar or tubular element of the outer drum, this element comprising the structure upon which the screening or screen sections are mounted.

It is thus seen that rotation of the two drums in either direction is obtained by torque applied to the spur gear 30 at a predetermined R. P. M., which will be generally established by the speed desired for the overall dehydration procedure. The sides 32 of the spur gear 30 actually comprise a trunnion providing a supporting surface for the outer drum on one side thereof, such trunnion rotating against the curved surface of the trunnion bearing tire 36. As will be seen, there is another oppositely mounted forward trunnion which rotates with the twin drum unit. Two additional trunnions support the rear portion of the dehydrator unit, as will be described.

The two frame members 5 and 6, which provide support for the twin drum unit, are raised a considerable distance above ground level, at least sufficiently so to accommodate the referred to plenum chamber underneath. The support for the dehydrator mechanism is comprised of a framework consisting of two upright channel members 39, rear leg elements 41 and longitudinal members 40 and 40' interconnecting these pairs of vertical legs. In normal operation of the mechanism, the twin drum rotor unit is elevated at its forward end so that the dehydrator is disposed at an angle to the horizontal. The preferred angularity is from 3° to 7°. At any rate, by inclining the mechanism in the manner demonstrated by Figures 3a and 3b, it is seen that the product discharged into the interior thereof will be caused, by rotation of the two drums and by gravity, to progress gradually toward the lower discharge end of the unit.

The means for enabling pivoting of the dehydrator mechanism to the preferred angularity includes an arm 45 affixed at the rear of each of the frame members 40 and 40'. At their terminal ends, such arms are inclined upwardly and apertured to receive a pivot pin 46. The pin extends through both of the frame elements 5 and 6 and, hence, these elements and the entire frame is in pivotal relationship with respect to the longitudinal channel supporting members 40 and 40'.

A means is provided for tilting the dehydrator mechanism to its desired angle and maintaining the same at that angle throughout its period of operation. This is found in the frame at the forward end and which includes uprights 39 and a cross bar 50, the latter having two angle elements 51 and 52 in each corner. These angle braces provide support for two pulleys 55 and 56, rotatably mounted therein, and another sheave 57 is similarly rotatably mounted in a lateral extension 58 which is also affixed to one of the legs 39 near the top thereof. All three of these sheaves are in alignment, as indicated in Figure 2.

Figure 2:
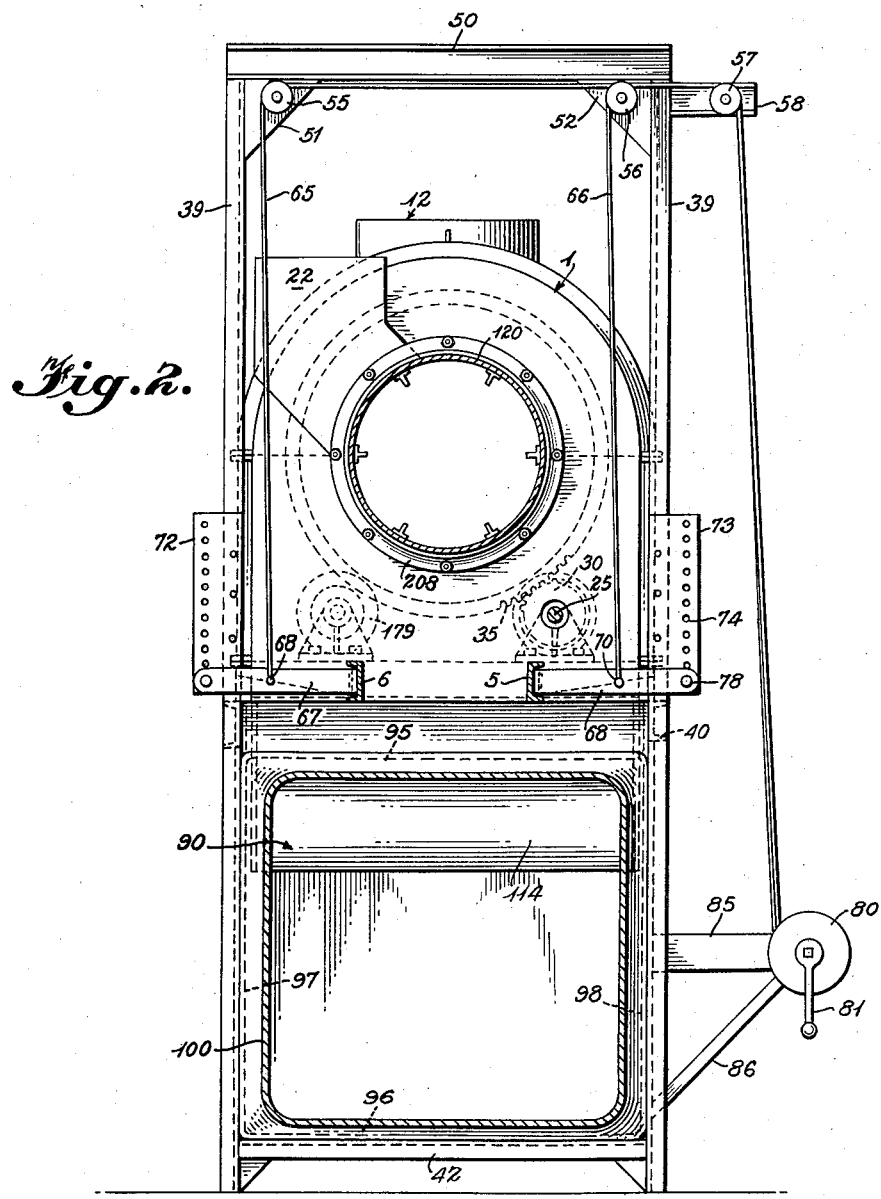
Figure 2 is a section view taken on the line 2—2 of Figure 1.

For movement of the entire framework upwardly to the desired angular position, wire ropes 65 and 66 are trained over the referred to pulleys and returned downwardly, as indicated in Figure 2, to a manual winch 80 having the usual drive handle 81. The winch is supported upon an angular framework comprising braces 85 and 86 and any ordinary form of arrangement such as a ratchet means, generally indicated at 83, is provided to lock the winch in place, thus maintaining the unit in a position of angularity with its forward end at any predetermined elevation above ground level.

The wire ropes at their opposite ends are respectively affixed by pins 69 and 70 to two lateral cross arms 67 and 68 which extend outwardly on each side of the unit. Each of these, as shown in Figure 2, is bolted or welded to the respective frame members 5 and 6. The cross arms 67 and 68, positioned laterally with respect to the framework, are apertured at their respective ends for reception of a locking pin 78. The two upright elements 39 of the forward framework are also provided with two flanges 72 and 73, one on each side of the housing and each extending somewhat outside of the housing. These flanges, located in a vertical plane immediately adjacent the cross arms 67 and 68, are each provided with a series of apertures 74, adapted to receive the locking pins 78 after adjustment of the forward end of the unit to the desired level has been acomplished.

It will thus be seen that by winding these wire ropes on the winch 80, the twin drum dehydrator unit is caused to be pivoted upwardly upon the main frame members 5 and 6 to a position that is determined to be at the proper angularity to ground level. When this position is reached, the unit is secured in place by inserting the locking pin 78 through the outer apertures of the respective arms 67 and 68 and also through the complementary and adjacent apertures 74 found in each of the side flanges 72 and 73. Such pins then maintain the unit in this predetermined and adjusted position.

The large chamber underneath the twin unit I prefer to designate as a plenum chamber. This is generally indicated at 90 and, due to the interfitting or telescoping skirts 2 and 4, is interconnected with the twin drum assembly in largely sealed relationship. The plenum 90 is adapted to initially receive air at elevated temperatures which is then forced through the assembly at predetermined velocities. Extending substantially under the entire twin rotor assembly, the chamber 90 is substantially rectangular in cross section, having opposed walls 95 and 96 at top and bottom and walls 97 and 98 at the sides. These side walls at the inby end of the plenum chamber are angled slightly towards each other to form somewhat of a funnel configuration 100 (Figure 1), the latter being affixed, by means of a suitable collar 102, to a fan housing 103. Located within the housing 103 is a blower or fan assembly 105 mounted in the usual manner on any form of bearing support 110. Although not shown, it is to be understood that air at elevated temperatures is pumped into the plenum chamber and thence into the twin rotor units from a source of supply which might comprise a heat exchanger or a propane gas combustion chamber. The latter source is desirable as the products of combustion thereof are neither noxious nor toxic.

The plenum chamber 90 is, as stated, largely sealed with respect to the twin drum units in order that air passing therethrough is efficiently transmitted through these units to accomplish the stated functions. Accordingly, both ends of the housing 1 are closed to the atmosphere by means of a wall 112 at the forward end and a wall 116 at the opposite, discharge end. Both forward and rear walls are provided with appropriate circular openings to accommodate the front and rear tubular elements which support the concentric, screened drums. In order that the unit be in comparatively sealed relationship with the plenum chamber, the forward wall continues downwardly with a configuration that will accommodate such chamber during the pivoting movement. Thus, the wall 112 extends into a right-angular portion 113 and a further downwardly disposed wall 114. The latter is of sufficient length to extend an appreciable distance into the plenum chamber 90 when the unit is in the position shown in Figures 3a and 3b, or in its fully raised position.

It is thus to be understood that the two side walls 2 and 4 of the outer casing, described above, extend down sufficiently to interconnect with the respective end walls 112, 114 and 116. They are thus of a configuration to match these two series of end walls and, toward the front of the mechanism, extend downwardly a greater distance than at the rear as indicated in Figures 3a and 3b. Hence, the side walls of the housing 1 and the end walls, in cooperation therewith, provide a continuous and relatively sealed passageway for air at elevated temperatures, despite any angularity of the unit.

The construction of the twin drum structure will now be referred to. At its forward end, the enlarged tube 10, forming an air discharge outlet, leads directly to a tubular element or collar 120 of comparative dimension. At the opposite end, the air discharge member 11 also is made integral with or connected to a similar tubular element 121 of the same size as member 120. These two tubular elements at each end 120 and 121, respectively, provide the basic framework for the other related elements of the twin drum structure.

The two tubular elements 120 and 121 are interconnected and maintained in opposed relationship with respect to each other by a series of longitudinally disposed and radially spaced T-bars 128 secured in any suitable manner to the inner periphery of each of the elements 120 and 121. As shown in the drawings, and particularly Figure 6, there are six of such longitudinal T-members, equally spaced, and since they extend through the length of the unit, such provide support for the separate screens of the inner, rotatable drum.

Support for the external or outer concentric drum is found in these two tubular elements. Such includes a series of spreaders or demountable spokes 130 which are attached to the inner tubular elements in the manner particularly depicted in Figure 6, here shown as by bolts 131. These spreaders 130 are radially mounted and interconnected with a duplicate series of longitudinal and radially spaced T-bars 140, each of the spreaders being bolted as by bolts 141 to the inner flange of such T-bars, as shown in Figure 6. The lateral or outward flange of each of the T-bars is then affixed by welding or other suitable media to the concentric tubular element 135 at the forward end of the apparatus and to tubular element or collar 136 at the after end thereof. These last two tubular elements provide the basic framework for related structures making up the outer concentric drum.

With respect to the drum construction just described, I have provided an alternative form that is useful from the aspect of disassembly of the unit, particularly for the necessary cleaning operations. Such is illustrated in Figure 7 where it is seen that the usual spreaders 130 hereinbefore described may be replaced by two adjacent roller assemblies, comprising a form of dolly, generally indicated at 138. As shown in Figure 7, four of the remaining T-elements 140 would still be held in place by the spreaders 130. It is contemplated that, during a cleaning operation, these would be initially removed and then the inner drum withdrawn from the unit on the referred to rollers. To this end, an additional base plate 145 is provided, and this is appropriately secured to the collar 120, as by bolts 143. The plate has a circular configuration to appropriately match the circumference of the collar 120. Welded to the opposite sides of this plate are two yokes 144 and 146, these being adapted to retain a shaft 144 upon which the two rollers 147 are rotatably mounted. Such yokes are mounted in the same relative position as two of the adjacent, referred to spokes 130. Hence, the yokes are necessarily positioned with their respective center lines 60° apart, speaking of an arc scribed with respect to the axis of rotation of the two drums. The rollers 147 are thus adapted to ride upon the two T-rails, here designated at 142 and 148, and which in this instance constitute a trackway. With the other spreaders removed, as shown in Figure 7, the inner drum can then be rolled out of the assembly with little difficulty. A similar dolly means can be provided at the opposite end of the twin drum assembly.

The dolly construction just referred to may be employed as a permanent or temporary expedient. When permanently installed, it will be found that the other spreaders or spokes 130 will be sufficient to maintain the inner drum construction in position during rotation thereof. On the other hand, it may be desirable to use the dolly only as a temporary means for removal of the inner drum; in this instance, the appropriate spokes or spreaders 130 are substituted for the plate 145 and related apparatus during the normal operation of the dehydrator mechanism. When dismantling thereof is desired for cleaning or for other purposes, two of such spokes 130 can be removed and the dolly apparatus substituted. By this simple expedient, removal of the relatively heavy inner drum is greatly facilitated.

The framework which has been spoken of, and particularly the framework consisting of the longitudinal T-sections 128 and 140, respectively, constitutes the supporting structure for the two separate screens attached to the inner and outer drums. For example, the inner drum is provided with a circular inner screen 150 of heavy expanded metal or punched plate. Such a screen, having openings of approximately three-fourths inch mesh is preferred. This is welded or otherwise appropriately affixed to the various T-sections 128 and, at its terminal ends, to the two cylinders 120 and 121, respectively. Such a heavy mesh screen thus extends throughout the length of the inner unit. The inner, heavy mesh screen 150 is surmounted by an additional, comparatively fine mesh screen cloth 155. Such is wrapped around the outer circumference of the inner drum and may be secured to it by any known method as by lacing wire.

In similar fashion, the outer drum is also comprised of a double layer of open screening. Here a heavy expanded metal or punched plate 160, with openings of the same size (approximately ¾" mesh), is superimposed about the six T-sections 140 and affixed to same in such manner as to leave slots or grooves for the reception of the inner and finer mesh screen 165. To this end, a series of longitudinal bars 161 are positioned in between the outer screen 160 and the described T-bars 140. If the T-bars and elements 161 are welded in the position shown in Figure 4, it can thus be appreciated, because of the narrower width of the members 161, that a groove, generally indicated at 162, is provided.

Thus, the outer, finer mesh screens 165 may be removably mounted adjacent to the respective sections of the outer screen 160. The edges of such finer screens are simply inserted in the referred to grooves 162, within which they are easily reciprocated. The obvious purpose of such a construction is, of course, to facilitate cleaning operations after the unit has been in usage for that length of time necessitating same. Ease of removal of the outer screens 165 facilitates cleaning of these screens and if the inner drum be mounted upon a dolly 138, as described in the foregoing, the inner drum is also adapted to be easily removed from the housing for cleaning purposes.

By this double drum construction, it is seen that there is an appreciable area left in between the two screens, namely, that cross-sectional area between the outer circumference of the inner screen and the inner side wall of the outer screen. This area is designated at A, Figure 4. Actually, such area A comprises an annulus, or a ring-shaped area, enclosed between two concentric circles. In this instance, the concentric circles are represented by the peripheries of the respective, perforated drums. The charging chute 22 is so located, as shown in Figures 2 and 3a, as to directly funnel the product into this space between the two drums. Such chute, provided with a front plate 170, has a slanted bottom 171 and discharges through an opening, generally indicated at 174, Figure 3a, into the space or annulus A between the drums, just referred to. The chute is thus so constructed and arranged that it will discharge directly into that concentric area without spillage of the product to any portion of the apparatus other than to such space. As indicated in the foregoing, the two units, being secured together in the fashion described, simultaneously rotate together and the common drive means involving the gear 30, hereinbefore described, is adapted to accomplish this rotation. Such gear, as stated, meshes with a large ring gear 35 that is secured around the circumference of the outer drum and is actually attached to the cylinder 135 at the forward end of the dehydrator apparatus.

Roller supports or trunnions, permitting ease of rotation of the double drum construction, are provided at both ends thereof. For example, and referring to Figures 2, 3a and 3b, it is seen that a roller or trunnion, generally indicated at 179, is positioned at the same angularity on the opposite side of the drum and in opposed relationship to the drive gear 30. This trunnion, with the exception of the gear unit found in gear 30, is of similar construction, having two sides 180 between which is located a shaft 181, the latter being cut deep enough with respect to the periphery of the sides to maintain the gear 35 therebetween without contacting the same. The gear 35, being of T-shape in configuration and actually comprising a trunnion tire, rests against the sides 180 on this side of the double drum construction during the rotation thereof. The trunnion 179 is supported by suitable bearings 185, mounted upon stanchions 188. The latter, as indicated in Figure 2, are secured directly to the base frame members 5 and 6, respectively. Thus at the forward end there is a rolling support for the twin drum unit, one of the supporting elements including a gear arrangement to engage a complementary ring gear or trunnion tire upon the periphery of the outer drum.

A similar arrangement of parts provides a trunnion support for the twin drum unit at its after or discharge end. Since, in the embodiment herein described, there is no drive involved at this end, there is only need for a simple trackway or trunnion tire 190 which is engaged by the same type of trunnion, generally indicated at 194. The track 190 circumvents the exterior of the outer drum or, more particularly, the periphery of the collar 136. The trunnion or roller 194 is likewise mounted in suitable bearings 196, supported upon stanchions 197. Referring to Figure 3b, it is seen that this stanchion is mounted upon the main frame member 6. Another trunnion, generally indicated at 198 and in all respects the same as roller 194, is placed upon the other side of the twin drum unit and positioned oppositely on the main frame member 5. These two after trunnions are mounted at the same angularity with respect to each other as that found with respect to the forward roller supporting constructions. Hence, by this medium of rotational support, it is seen that central, supporting shafting or equivalent structure is unnecessary and that the two discharge vents 10 and 11, respectively, are open and unimpeded for the discharge of the used drying medium.

It is to be observed that there is a double walled structure involved in the fabrication of the twin drum housing. Walls 112 and 116, at the forward and rear ends, respectively, of the apparatus have already been described. In addition, the forward end is provided with a further wall 200, also mounted at right angles to the axis of rotation. Similarly, the after end of the apparatus is provided with an additional wall 116', the latter also comprising one side of a discharge means, to be more particularly described.

In order that the heated air charged into the mechanism is not dissipated to the atmosphere without penetration of or passage through the product charged thereto, various seals are provided with respect to these double wall constructions just described. Accordingly, seals 205 and 206 (Figure 3a) are circular, extending all around the periphery of the outer drum. These seals consist of multiple circular strips of heat-resistant, flexible material, such as neoprene. They are mounted, as by the usual spaced bolts 207, directly to the respective walls described above. Thus seal 205 is affixed to the forward wall 112 with the flexible material pointing toward the rear and seal 206, with the horizontal flap thereof extended in an opposite direction, is affixed to the wall 200 in the same manner. At the rear of the mechanism, two circular seals 210 and 212 (Figure 3b), respectively, are similarly positioned. Each of these seals is flexed, as indicated, so that the inner sides thereof bear against the forward and after cylinders 135 (Figure 3a) and 136 (Figure 3b), respectively. Being tensioned against these in the maner shown, it is clear that these seals provide effective sealing measures during rotation of the double drum unit, preventing discharge of the drying medium through the several described walls at the juncture of such stationary end walls with the rotating elements.

Additional seals, fabricated in the same maner as and similar to those indicated at 205, 206, 210 and 212, are also provided adjacent to the two tubular elements 120 and 121, referred to above. Thus, seal 208, also circular in configuration, is positioned between the element 120 and affixed by bolts or other suitable media to the wall 112. At the opposite end seal 209, of like configuration, is bolted to the plate 220. In both instances, the free, inner periphery of such flexible seals slidably bear against the respective tubular elements 120 and 121 to prevent the passage of heated air between the referred to walls and the rotatable tubular elements.

Reference has been generally made to a discharge spout for the product at the rear of the twin drum unit. Reference to Figure 3b will indicate that this spout has for one of its side walls the referred to housing wall 116'. The spaced plate 220 is affixed to this end wall and such plate enlarged at its lower portion, as at 222, to provide a chamber, generally indicated at 225, which functions as a downspout for the discharged product. The downspout 225 is thus in a position to receive partially dehydrated products after they have passed through the mechanism and after they have been discharged in predetermined and measured quantities by means of a spiral conveying element, to be described.

Reference has been made to the filling of the space between the two rotating drum units in an amount depicted approximately in Figure 4. As here seen, the product occupies approximately four-fifths of the area A with only one-fifth of this area remaining unfilled. In the operation of the mechanism, it is necessary and desirable that the air discharged through the plenum into the space A between these two screens be routed only through that area which is so filled with the product. In order to accomplish this, I have provided two rotary seals, generally indicated at 235 and 236, respectively.

In the position shown in Figure 4, the rotary, longitudinal seals are situated, with respect to the axis of rotation of the double drum unit and with respect to each other, at an obtuse angularity of approximately 120°. In other words, the extended radii from the axis to the center of each rotary seal create an angle of approximately 120°. In such position, these two rotary seals represent that approximate portion of the drum up to the fill line thereof, as also shown in Figure 4.

The purpose of these seals is to prevent flow of the dehydrating medium around the periphery of the outer drum and thence through the opposed discharge outlets 10 and 11 or top outlet 12; instead, the seals conduct or force the air through the lower, product filled portion between the screened drums. There is thus an effective dehydrating contact of the drying medium with the product particles. It is thus seen that the only drying air which reaches the center outlet 12 and consequently passes through the open or unfilled area between drums is that which has already performed its purpose by being forced through the product located in the area A, as indicated in Figure 4.

It will be observed that the two end walls 116 and 200 perform an additional function with respect to the rotating sealing means—such are interconnected directly to these end walls. The rotating seals are actually so mounted that the arcuate distance therebetween may be varied somewhat and, in the preferred embodiment of the invention, this possible variation, or extent of adjustment, may amount to approximately nine inches. The means for varying the distance between the two rotary, longitudinal seals primarily resides in the curved slots 250, 251 formed in each of these end walls 200 and 116, respectively. Such slots are circumferential with respect to the outer drum, so that any adjustment of the rotary seals will not alter their radial position with respect to either the outer drum or the casing wall 9. At any rate, the inner supporting structure of each rotary sealing device includes a tubular element 240 running the length thereof. At each end, this member 240 is fitted with inner shafts 257 and 258 as illustrated in Figure 5.

The two shafts 257 and 258 may be made integral with, or secured to, two plates or flanges 263, 264 and two sponge rubber bushings 260, 261 are secured to these flanges. The shafts supporting the inner tubular element 240 are journaled in appropriate journals 268 and 269 so that the entire unit is freely rotatable and turned in unison with the rotation of the outer drum unit. The two tubular elements 245, fabricated of some elastic and resilient material such as rubber, neoprene and the like, may be extended between and vulcanized or otherwise affixed directly to these two sponge rubber bushings 260 and 261. It thus appears that these longitudinal flexible seals may be flexed to any contour throughout their length and, because of the cushioned bushings 260 and 261, the ends of these seals will follow this same, flexed contour.

Both of these rotary longitudinal seals are provided with means to apply air pressure to the interior thereof and to this end, the shafts 257, or those facing the inby end of the mechanism, are bored, as at 280, such bores terminating in any known type of air valve 270. The latter permits air pressure to be applied to the interior of the rotary seals and a pressure of from one to three pounds is preferred. In order that air under pressure be admitted throughout the entire length of the rotary seal, the interior tubular element 240 is provided with suitable passageways 285; hence, air admitted under pressure fills the entire interior of the tubular neoprene casing 245. In operation, and at this relatively low air pressure, the seals will assume the configuration shown in Figure 4. As here depicted, the contacting portion of each seal, and particularly that surface thereof riding upon the outer drum, is relatively substantial. Such contacting portions closely fit the contour of both the outer wall of the outer drum and the inner wall of the curved hood and thus effectuate a substantial seal against bypass of the dehydrating medium at these points.

Reference has been made to the alternate positioning of the rotary seals, accomplished by varying their angularity with respect to each other by use of the slots 250, 251 within which these seals ride.

After adjustment has been made in the desired position, means may be provided to lock the respective shafts of each rotary seal in position. This may take the form of locking nuts or any other usual medium, known to the art. This form of rotary seal is fully effective to prevent the bypass of air at elevated temperatures, as pointed out above. Since the two seals rotate in unison with the outer screen, there is no friction involved by relative movement against such screen and, hence, wear of the seal is substantially diminished, if not, to all practical purposes, completely eliminated. Furthermore, the interior surface of the housing may be made with a smooth surface and lubricated. The inflated neoprene tube 245 will not then cause an undue amount of friction loss or wear when contacting this interior surface during rotation of the twin drum unit.

By provision of the adjustable feature referred to above, the amount of product discharged into the space comprising the dehydration chamber can be varied, yet this sealing means so varied proportionally as to be fully effective despite variations in the load imposed upon the mechanism.

The retention of the product in the twin drum unit controlled by a spiral means 300 which is mounted upon and the rate of discharge of the product therefrom is the inner circumference of the tubular element or core 121 supporting the inner screens at the discharge end of the unit. This product control spiral 300 is also secured at its outer periphery to the complementary core 136 providing support, as described above, for the outer drum of the unit. Such spiral 300, as here shown in the preferred embodiment, is actually comprised of three turns around the inner core. It thus closes off the area between the inner and outer drums except at the opening to the spiral developed by the leading edge of the blade and the second pitch of the spiral.

Whether rotation of the unit be clockwise or counter-clockwise, the spiral is so positioned that its leading edge will not take a "bite" of the mass of product as it tumbles down the incline passageway between the two drums. In other words, the spiral is so mounted that the pitch thereof is reverse to the direction of rotation of the two drums. This means that as the product tumbles at its upper portion, a certain amount will nevertheless fall into the space designated by the leading edge of the spiral and bounded by the second convolution thereof and will thus gradually progress through the spiral to the discharge outlet 225. Here the function of the blade might be described as entailing a weir principle, i. e., spillage of the product in controlled amounts over the leading edge of the blade and thence into the succeeding convolutions. With the spiral in this position, opposite rotation of the twin unit will cause the leading edge to take a "bite." Normally, this would not be the preferred procedure since the blade would discharge too rapidly; accordingly, this opposite rotation is desired only for complete discharge of the product from around the entire space between the two drums—an operation which is performed when it is desired to completely empty the dehydrator of the product for cleaning or other purposes.

The pitch of this spiral also determines the rate of discharge of the product from the unit. Obviously, the smaller the pitch thereof, the smaller the quantity of product that enters its convolutions and is entrapped between the first and second pitches thereof; and the greater the pitch, the greater the quantity that is entrapped between convolutions. At any rate, as herein shown, the product progresses through the blade or spiral and is discharged by gravity therefrom during approximately one-third of each revolution of the unit.

A secondary control of the discharge rate is obtained by a slidable gate valve 315 (Figures 8 and 9) that is installed between the first and second pitch of the spiral. This gate is of a rectangular contour adapted to fit between convolutions of the spiral in such manner that its depth with respect thereto can be adjusted. As here shown, the gate is mounted to reciprocate in a slot 316 cut in the shell 121 of the inner drum. Adjustment of the gate is effectuated by manual means including a slide 320 which is interengaged with a threaded element 318 through a ball-socket form of interconnection. The slide rides in a casing 325 which is fitted with a tapped element 327 for reception of the referred to threaded member. The casing 325 is affixed to the inner collar 121 by means of the usual bolts 326 as shown in Figures 8 and 9. Manual regulation of the gate is accomplished through a control 330.

It is thus seen that by turning the manual lever 330 in one direction, the slide will progress inwardly from the position shown in Figures 8 and 9 and, conversely, rotation of the threaded element 318 in an opposite direction causes the gate valve 315 to progress outwardly until it completely closes the passageway formed by the spiral, in which position it is shown in these figures. From the foregoing, it will be understood that if the gate 315 is closed, no product particles can enter the spiral and thus none will be discharged from the apparatus; whereas, if the gate is fully opened, the full discharge capacity of the spiral will be developed. By partially closing the gate to the degree desired, the discharge capacity of the spiral and of the unit can be accurately metered and controlled, it also being understood that the pitch of the spiral further regulates the maximum discharge of the double drum unit. The unique advantages of this discharge control element are several in number: the spiral holds the product in between the drums at the daily initial loading until the unit is properly loaded; it controls the rate of discharge of the product; and when an operation is concluded, the spiral will unload the final drum load by merely reversing the direction of rotation of the drum unit.

In the preferred embodiment of the invention, the size of the structure is such to provide for an hourly output of partially dehydrated product of approximately three thousand pounds. In the unit herein described, the relative measurements of the various components involve an overall length of the twin drum construction, including the air inlet and outlet collars 10 and 11, respectively, of approximately 16½'. The diameter of the outer drum is approximately three feet, the inner drum having a diameter in the neighborhood of two feet. The length of the two screens, above described, is preferably ten feet and the distance between screens, radially speaking, is six inches, this space representing the loading space for the product and hereinbefore referred to as space A.

From the foregoing description of this invention, its operation should be generally understood. After loading of the product into the space A between the twin drums by means of hopper 22, air is introduced through an appropriate filter chamber and then into a heat exchanger. It is then discharged into the intake of the blower 103. As an alternative, heated air can be obtained directly from the burning of propane gas—a desirable operation because of the purity of the gas and the fact that the products of combustion thereof are harmless.

Air from the blower is forced into the plenum chamber 90 and thence into the housing 1 superimposed over the twin units. This heated air then progresses throughout the open mesh area of the outer drum, thence through the product to be dehydrated and which has been introduced into the area between the outer and inner drums, and is then evacuated into the atmosphere through both the feed opening 10 and the discharge opening 11 as well as through the top exit 12 in this housing.

The path of flow of the dehydrating medium from the plenum chamber through the twin drum unit and thence out the three discharge openings 10, 11 and 12 is diagrammatically indicated by the arrows found in Figures 3a and 3b. Although a cross section view, the flow so indicated demonstrates the passage of such medium through the lower portion of the twin drum unit, or through the space A which is substantially filled with the product particles.

The rate of feed of the product is regulated by varying the speed of rotation and the angle of inclination of the drum assembly so that the area between these two concentric drums of the unit is solidly filled with the product for approximately three-fourths of the circumference thereof as shown in Figure 4. In the preferred installation, the rotation of the drums is counterclockwise, as viewed from the said end. Normally, the inby feed of the product is so regulated that approximately one-fifth of area A, as shown in Figure 4, is unfilled and the product, rotating counterclockwise, tumbles from the apex of rotation to a point approximately opposite the rotating seal 235, when viewing this figure. This tumbling action is maintained in order that the relative position of the particles of food product being dehydrated are changed so that different surfaces of the individual particles will be exposed to the hot air being blown therethrough. An excessive amount of tumbling is not desirable because the tumbling tends to cause mechanical abrasion of the food particles. Accordingly, a preferred speed of rotation of the unit is three R. P. M. This has been found to be an optimum speed, having reference to the size of unit as described above which will cause effective surface exposure of the mass without such excessive tumbling as to create an abrasion problem. It is evident, however, that effective speeds of rotation will vary with variance in size of the unit.

Since the dehydrated product is more or less of an immovable mass for approximately three-fourths of the cycle of rotation, it is apparent that the tumbling action is reduced to a minimum. Actually, the tumbling action can be established at the optimum point by so varying the feed that the unfilled area in the drum (as, for example, seen in Figure 4) is reduced or increased so as to shorten or lengthen the tumbling distance.

Hot and dehumidified air, introduced into the plenum chamber 90, in being forced through the solid mass of the product lying in the area between the inner and outer drums, passes through the screen area of the inner drum into the core thereof. From here, a portion, or about two-thirds, of the air, now somewhat saturated with moisture, is directed to the outside atmosphere through the feed end as well as the discharge end of the inner drum core area. The remaining portion, or about one-third, of this saturated air passes through the inner drum mesh area and through the comparatively small amount of food product tumbling in this area. Here, the particles are again exposed to the hot air and additionally dehydrated. The air then passes through the mesh of the outer drum, at the unloaded portion thereof as seen in Figure 4, and is exhausted to the atmosphere through the top discharge opening 12.

It is further obvious that the food particles, being dehydrated, progress through the dehydrator from the feed end to the discharge end at a time rate dependent upon the R. P. M. of the unit, which is preferably about three, and the angle of incline of the unit. Such angle of incline is preferably 5° to the horizontal but may vary within a range of from 3° to 7°. In normal practice, the time interval of dehydration varies between thirty and fifty minutes, such time element being somewhat dependent upon the particular physical factors which are necessarily encountered, such as the character of the product and the prevailing temperature conditions where the apparatus is operated.

The instant invention represents a unique departure from the known art relating to dehydrating mechanisms. Although relatively simple of construction, it is efficient in operation and eliminates many of the problems heretofore confronting the art. As exemplary among these may be named the following: effective use of the dehydrating medium to its fullest extent without loss or waste thereof through by-passing or so-called blow-by; reduction, if not complete elimination, of abrasion of the product particles; large capacity to handle relatively great amounts of product over a short period of time; a type of control of the apparatus that is variable in nature and permits metering of the product through the mechanism in order to suit the different conditions arising with respect to different types of food products; and provision of a means and method of partial dehydration that assures uniform and complete surface contact of the particles of the mass with the dehydrating medium.

While I have shown my invention in but one form it, is obvious that many changes and variations may be made without departing from the spirit thereof, and only such limitations should be placed thereupon as are specifically set forth in the following claims.

I claim:

1. In a dehydrator apparatus adapted to receive a dehydrating medium, an enclosed, elongated casing having an upper and lower portion, at least two concentric, perforated, rotatable drums within said casing, means to mount said drums on a substantially horizontal axis, said drums being spaced apart to provide a product receiving area, means to simultaneously rotate said drums, means to charge materials to be dehydrated to said area, longitudinal rotary sealing means between the outer of said drums and said upper portion of said casing to prevent flow of said medium around the top portion of said outer drum, and means to discharge said medium through said drums and said area.

2. In a dehydrator apparatus adapted to receive a dehydrating medium, an enclosed, elongated casing having an upper and lower portion, at least two concentric, perforated, rotatable drums within said casing, means to mount said drums on a substantial horizontal axis, said drums being spaced apart to provide a product receiving annulus, means to simultaneously rotate said drums, means to charge materials to be dehydrated to said annulus, spaced, longitudinal rotary sealing means between the outer of said drums and said upper portion of said casing to prevent flow of said medium around the top portion of said outer drum, means to discharge said medium through said drums and said area, and spiral means at one end of said annulus adapted to control the rate of discharge of said materials.

3. In a dehydrator apparatus adapted to receive a dehydrating medium, an enclosed, elongated casing having an upper and lower portion, at least two concentric, perforated, rotatable drums within said casing, means to mount said drums on a substantially horizontal axis, said drums being spaced apart to provide a product receiving area, means to simultaneously rotate said drums, means to charge materials to be dehydrated to said area, longitudinal rotary sealing means between the outer of said drums and said upper portion of said casing to prevent flow of said medium around the top portion of said outer drum, said sealing means comprising an elongated, flexible tube extending the length of the outer of said drums, said tube being rotatably mounted between said casing and said outer drum, said tube being airtight and having means to apply air pressure to the interior thereof, and means to discharge said medium through said drums and said area.

4. In a dehydrator apparatus adapted to receive a dehydrating medium, an enclosed, elongated casing having an upper and lower portion, at least two concentric, perforated, rotatable drums within said casing, means to mount said drums on a substantially horizontal axis, said drum being spaced apart to provide a product receiving annulus, means to simultaneously rotate said drums, means to charge materials to be dehydrated to said annulus, longitudinal sealing means between the outer of said drums and said upper portion of said casing to prevent flow of said medium around the top portion of said outer drum, said sealing means comprising an inflated, rotatable, flexible tube, means to discharge said medium through said drums and said area, and discharge means for said materials including a product control spiral in said annulus at one end thereof, the convolution of said spiral being approximately normal to said axis and fixed for rotation with said drums.

5. In a dehydrator apparatus adapted to receive a dehydrating medium, an enclosed, elongated casing having an upper and lower portion, at least two concentric, perforated, rotatable drums within said casing, means to mount said drums on a substantially horizontal axis, said drums being spaced apart to provide a product receiving annulus, means to simultaneously rotate said drums, means to charge materials to be dehydrated to said annulus, longitudinal rotary sealing means between the outer of said drums and said upper portion of said casing to prevent flow of said medium around the top portion of said outer drum, said sealing means comprising an elongated, flexible tube extending the length of the outer of said drums, said tube being rotatably mounted between said casing and said outer drum, said tube being airtight and having means to apply air pressure to the interior thereof, means to discharge said medium through said drums and said area, discharge means for said materials including a product control spiral mounted in said annulus, the convolution of said spiral being approximately normal to said axis and fixed for rotation with said drums, and a control gate between adjacent convolutions of said spiral, said gate being adapted to adjust the open area between said adjacent convolutions.

6. In a dehydrator apparatus adapted to receive a dehydrating medium, an enclosed, elongated casing having an upper and lower portion, at least two concentric, perforated, rotatable drums within said casing, means to mount said drums on a substantially horizontal axis, said drums being spaced apart to provide a product receiving annulus, means to simultaneously rotate said drums, means to charge materials to be dehydrated to said annulus, longitudinal rotary sealing means between the outer of said drums and said upper portion of said casing to prevent flow of said medium around the top portion of said outer drum, said sealing means comprising an elongated, flexible tube extending the length of the outer of said drums, said tube being rotatably mounted between said casing and said outer drum, said tube being airtight and having means to apply air pressure to the interior thereof, means to discharge said medium through said drums and said area, discharge means for said materials including a product control spiral mounted in said annulus, the convolution of said spiral being approximately normal to said axis and fixed for rotation with said drums, a control gate between adjacent convolutions of said spiral, said gate being adapted to adjust the open area between said adjacent convolutions, means to pivot said casing at the rear end thereof, and means to raise said forward end of said casing whereby said drums may be angled to the horizontal to facilitate discharge of said product.

7. In a dehydrator apparatus for food materials, an enclosed, elongated housing, two perforated and concentric drums within and spaced from said housing, means to maintain said drums on a substantially horizontal axis, said drums forming an area between the drums comprising an annulus, means to seal the space between said annulus and said housing comprising an elongated flexible tube extending approximately the length of the outer of said drums, oppositely positioned rotatable bearing means mounted upon said casing, said tube being rotatably mounted in said bearing means, means to admit air under pressure to said tube, means to rotate said drums, means to charge said materials to said area, and means to flow a dehydrating medium through said area.

8. In a dehydrator apparatus for food materials, an enclosed, elongated housing, two perforated and concentric and rotatable drums within and spaced from said housing, said drums forming an area between the drums comprising an annulus, at least two sealing means to seal the space between said outer drum and said housing, each of said sealing means being located in the upper portion of said housing and being spaced apart approximately 120° with respect to the axis of rotation of said drums, said sealing means comprising an elongated flexible tube extending approximately the length of the outer of said drums and mounted upon said casing, each of said sealing means contacting the inner side of said housing and said outer drum whereby the space therebetween is blocked to the flow of a gaseous medium around the periphery of the said outer drum, means to admit air under pressure to said tube, means to rotate said drums, means to charge said materials to said area, and means to flow a dehydrating medium through said area.

9. In a dehydrator apparatus for food materials, an enclosed, elongated housing, two perforated, concentric and rotatable drums within said housing, means to mount said drums on a substantially horizontal axis, said drums forming an area between the drums comprising an annulus, means to rotate said drums, means to charge said materials to said area, means to control discharge of said materials from said area, said last-named means comprising a helical spiral, said spiral being positioned between said drums at the discharge end thereof, a control gate in said spiral, said gate extending between adjacent convolutions of said spiral and being positioned radially with respect to the axis of rotation of said drums, said gate being mounted in slidable and reciprocable relationship with respect to said spiral, means to adjust the radial extension of said gate, and means to flow a dehydrating medium through said area.

References Cited in the file of this patent

UNITED STATES PATENTS

| | | |
|---|---|---|
| 565,522 | Stucky | Aug. 11, 1896 |
| 722,693 | Goings | Mar. 17, 1903 |
| 2,278,275 | MacDonell | Mar. 31, 1941 |
| 2,289,753 | Capstaff | July 14, 1942 |
| 2,360,838 | Atti | Oct. 24, 1944 |
| 2,367,174 | Renkin | Jan. 9, 1945 |
| 2,783,546 | Armstrong | Mar. 5, 1957 |

FOREIGN PATENTS

| | | |
|---|---|---|
| 11,154 | Great Britain | July 20, 1888 |